United States Patent
Hofmann et al.

(10) Patent No.: US 11,536,830 B2
(45) Date of Patent: Dec. 27, 2022

(54) DETERMINING OBJECT MOTION AND ACCELERATION VECTOR IN A VEHICLE RADAR SYSTEM

(71) Applicant: Arriver Software AB, San Diego, CA (US)

(72) Inventors: Martin Hofmann, Puchheim (DE); Habib Ur Rehman Paracha, Munich (DE)

(73) Assignee: Arriver Software AB, Linköping (SE)

( * ) Notice: Subject to any disclaimer, the term of this patent is extended or adjusted under 35 U.S.C. 154(b) by 286 days.

(21) Appl. No.: 16/772,505

(22) PCT Filed: Nov. 20, 2018

(86) PCT No.: PCT/EP2018/081947
§ 371 (c)(1),
(2) Date: Jun. 12, 2020

(87) PCT Pub. No.: WO2019/115179
PCT Pub. Date: Jun. 20, 2019

(65) Prior Publication Data
US 2020/0386883 A1 Dec. 10, 2020

(30) Foreign Application Priority Data
Dec. 12, 2017 (EP) .................................. 17206670

(51) Int. Cl.
*G01S 13/931* (2020.01)
*G01S 13/42* (2006.01)
(Continued)

(52) U.S. Cl.
CPC ............ *G01S 13/931* (2013.01); *G01S 13/42* (2013.01); *G01S 13/584* (2013.01); *G01S 13/72* (2013.01)

(58) Field of Classification Search
CPC ...... G01S 13/931; G01S 13/42; G01S 13/584; G01S 13/72; G01S 13/589
See application file for complete search history.

(56) References Cited

U.S. PATENT DOCUMENTS

| 2018/0011180 A1* | 1/2018 | Warnick ................. G01S 13/32 |
| 2018/0024239 A1* | 1/2018 | Branson .................. G01S 13/52 |
| | | 701/23 |

(Continued)

FOREIGN PATENT DOCUMENTS

| DE | 102013018310 A1 * | 4/2015 | ........... G01S 13/589 |
| DE | 102016206550 A1 | 10/2017 | |

OTHER PUBLICATIONS https://en.wikipedia.org/wiki/Kalman_filter accessed May 20, 2022. (Year: 2022).*
https://en.wikipedia.org/wiki/Polar_coordinate_system, accessed on May 20, 2022. (Year: 2022).*
https://en.wikipedia.org/wiki/Acceleration, accessed on May 20, 2022. (Year: 2022).*

(Continued)

*Primary Examiner* — Donald H B Braswell
(74) *Attorney, Agent, or Firm* — Arriver Software AB

(57) ABSTRACT

A vehicle radar system (3) which, for each one of a plurality of radar cycles, is arranged to, provide a measured azimuth angle ($\theta_m$) and radial velocity ($v_{dm}$) for a first plurality of detections (9, 20). For each one of the plurality of radar cycles, the radar system (3) is arranged to select one of these detections for each one of two velocity components ($v_x$, $v_y$) in a set of components ($v_x$, $v_y$, $a_x$, $a_y$; a) to be determined; select one detection from a second plurality of detections (9, 20) for each one of at least one corresponding acceleration component ($a_x$, $a_y$; a); calculate the components ($v_x$, $v_y$, $a_x$, $a_y$; a) for the selected detections; determine a calculated radial velocity ($v_{dc}$) for each one of at least a part of the other detections in the first plurality of detections (9, 20) using the calculated components ($v_x$, $v_y$, $a_x$, $a_y$; a); determine an error between each calculated and measured radial velocity ($v_{dc}$, $v_{dm}$); and determine the number of inliers. The set of (Continued)

components ($v_x$, $v_y$, $a_x$, $a_y$; a) that results in the largest number of inliers is then chosen.

14 Claims, 3 Drawing Sheets

(51) Int. Cl.
  *G01S 13/58* (2006.01)
  *G01S 13/72* (2006.01)

(56) References Cited

U.S. PATENT DOCUMENTS

2018/0356498 A1* 12/2018 Stachnik ................ G01S 13/42
2019/0113612 A1   4/2019 Eisenbarth et al.

OTHER PUBLICATIONS

International Search Report and Written Opinion of PCT/EP2018/081947, dated Feb. 13, 2019.
Kellner, Dominik, et al., "Tracking of Extended Objects with High Resolution Doppler Radar", IEEE Transactions on Intelligent Transportation Systems, vol. 17, No. 5, May 1, 2016 (May 1, 2016), pp. 1-13 [retrieved from the internet on Jun. 13, 2020].
Kellner, Dominik, et al., "Instantaneous Lateral Velocity Estimation of a Vehicle using Doppler Radar" Proceedings of the 16th International Conference on Information Fusion, ISIF (Intl Society of Information Fusi, Jul. 9, 2013 (Jul. 9, 2013), 8 pages [retrieved from the internet on Jun. 13, 2020].
European Search Report—17206670—Search Authority—Munich—dated Jun. 6, 2018.
International Search Report and Written Opinion—PCT/EP2018/081947—ISA/EPO—dated Feb. 13, 2019.

* cited by examiner

DETERMINING OBJECT MOTION AND ACCELERATION VECTOR IN A VEHICLE RADAR SYSTEM

CROSS-REFERENCE TO RELATED APPLICATIONS

This application is 35 U.S.C. § 371 national phase of PCT International Application No. PCT/EP2018/081947, filed Nov. 20, 2018, which claims the benefit of priority under 35 U.S.C. § 119 to European Patent Application No. 17206670.6, filed Dec. 12, 2017, the contents of which are incorporated herein by reference in their entirety.

FIELD OF THE INVENTION

The present disclosure relates to a vehicle radar system. For each one of a plurality of radar cycles, the vehicle radar system is arranged to provide a measured azimuth angle and a measured radial velocity for a first plurality of detections.

BACKGROUND

Many vehicle radar systems include radar transceivers that are arranged for generating radar signals that are transmitted, reflected and received by use of appropriate antennas of the radar system. The radar signals may for example be in the form of FMCW (Frequency Modulated Continuous Wave) signals.

Radar provides important information about the environment and its participants, including moving objects and stationary environment to enable implementing automated vehicle systems such as speed control and collision prevention, as well as other such as auto alignment, online bumper fascia calibration, ego motion estimation, scene understanding, lane keeping assist (LKA) and automated driving (AD).

At each radar cycle, the received radar signal provides a multitude of radar detections, and for each detection radial (Doppler) velocity $V_d$, radial distance r and azimuth angle θ are provided. The detections can be grouped as tracked objects, providing a common motion state for an extended object.

The motion state of an object describes, e.g., the distance from the ego vehicle to the object, a complete, relative or absolute, velocity vector of the object in relation to the ego vehicle, and a complete, relative or absolute, acceleration vector of the object in relation to the ego vehicle. The motion state of tracked objects is updated continuously to reflect changes in object motion. For instance, acceleration and velocity vectors of the motion state will increase in magnitude if a tracked object brakes or otherwise changes its velocity.

It can be assumed that those detections that belong to a certain extended object have the same velocity vectors. Therefore, in order to be able to determine which ones of the acquired detections that have the same velocity vectors and thus can be determined to belong to a certain extended object, it is desirable to obtain complete vectors for velocity and acceleration for all the detections in as few radar cycles as possible in an uncomplicated and reliable manner.

The object of the present disclosure is thus to provide a vehicle radar system that is adapted to determine complete vectors for velocity and acceleration in as few radar cycles as possible in an uncomplicated and reliable manner.

SUMMARY AND INTRODUCTORY DESCRIPTION OF PREFERRED EMBODIMENTS

The above described object is achieved by a vehicle radar system which, for each one of a plurality of radar cycles, is arranged to provide a measured azimuth angle and a measured radial velocity for a first plurality of detections. For each one of the plurality of radar cycles, the radar system is arranged to select one detection from the first plurality of detections for each one of two velocity components included in a set of components to be determined, where the two velocity components define a full velocity vector for a relative velocity, to select one detection from a second plurality of detections for each one of at least one corresponding acceleration component, and to calculate the components for the selected detections. For each one of the plurality of radar cycles, the radar system is furthermore arranged to determine a calculated radial velocity for each one of at least a part of the other detections in the first plurality of detections by use of the calculated components, to determine an error between each calculated radial velocity and the measured radial velocity, and to determine the number of inlier, where an inlier corresponds to an error that falls below an inlier threshold.

This object is also achieved by a method for a vehicle radar system, where, for each one of a plurality of radar cycles, the method includes acquiring a measured azimuth angle and a measured radial velocity for a plurality of detections associated with an object, selecting one detection from the first plurality of detections for each one of two velocity components included in a set of components to be determined where the two velocity components define a full velocity vector for a relative velocity, and selecting one detection from a second plurality of detections for each one of at least one corresponding acceleration component and calculating the components for the selected detections.

For each one of the plurality of radar cycles, the method further includes determining a calculated radial velocity for each one of at least a part of the other detections in the first plurality of detections by use of the calculated components, determining an error between each calculated radial velocity and the measured radial velocity, and determining the number of inliers, where an inlier corresponds to an error that falls below an inlier threshold.

The method includes repeating the above for all radar cycles in the plurality of radar cycles; the method then includes choosing the set of components that results in the largest number of inliers.

The radar system is furthermore arranged to choose the set of components that results in the largest number of inliers.

According to some aspects, the radar system is adapted to group those detections that correspond to inliers resulting from the chosen set of components, such that these detections form an extended object.

According to some aspects, the second plurality of detections is the same as the first plurality of detections.

According to some aspects, the second plurality of detections belongs to another radar cycle. The radar system is arranged to first calculate the velocity components for the selected detections, and then to calculate the at least one acceleration component by use of the calculated velocity components.

According to some aspects, the radar system is arranged to calculate the components by solving for these from the expression $$V_{dm}=(V_x+a_x\Delta t)\cos(\theta_m)+(V_y+a_y\Delta t)\sin(\theta_m)$$

for each selected detection where $\theta_m$ constitutes a measured angle between a radar system reference line and a direction towards the detection in question. According to some aspects of the embodiments of the present invention, the radar system is adapted to substitute $$a_x = a\frac{V_x}{|V_r|} \text{ and } a_y = a\frac{V_y}{|V_r|},$$

where $|V_T|$ is the magnitude of the relative velocity $v_r$, such that the components are ca elated by solving for these from the expression:

$$V_{dm} = \left(V_x + a\frac{V_x}{|V_r|}\Delta t\right)\cos(\theta_m) + \left(V_y + a\frac{V_y}{|V_r|}\Delta t\right)\sin(\theta_m).$$

Other examples are disclosed in this description.

A number of advantages are obtained by embodiments described in the present disclosure. Mainly, object tracking performance is improved, as well as ego dynamics estimation.

Furthermore, detections from multiple cycles can be used at the same time, which makes the algorithm robust even in case of low number of detections and in the presence of noise and outliers.

BRIEF DESCRIPTION OF THE DRAWINGS

The present disclosure will now be described more in detail with reference to the appended drawings, where.

DETAILED DESCRIPTION

Figure 1:
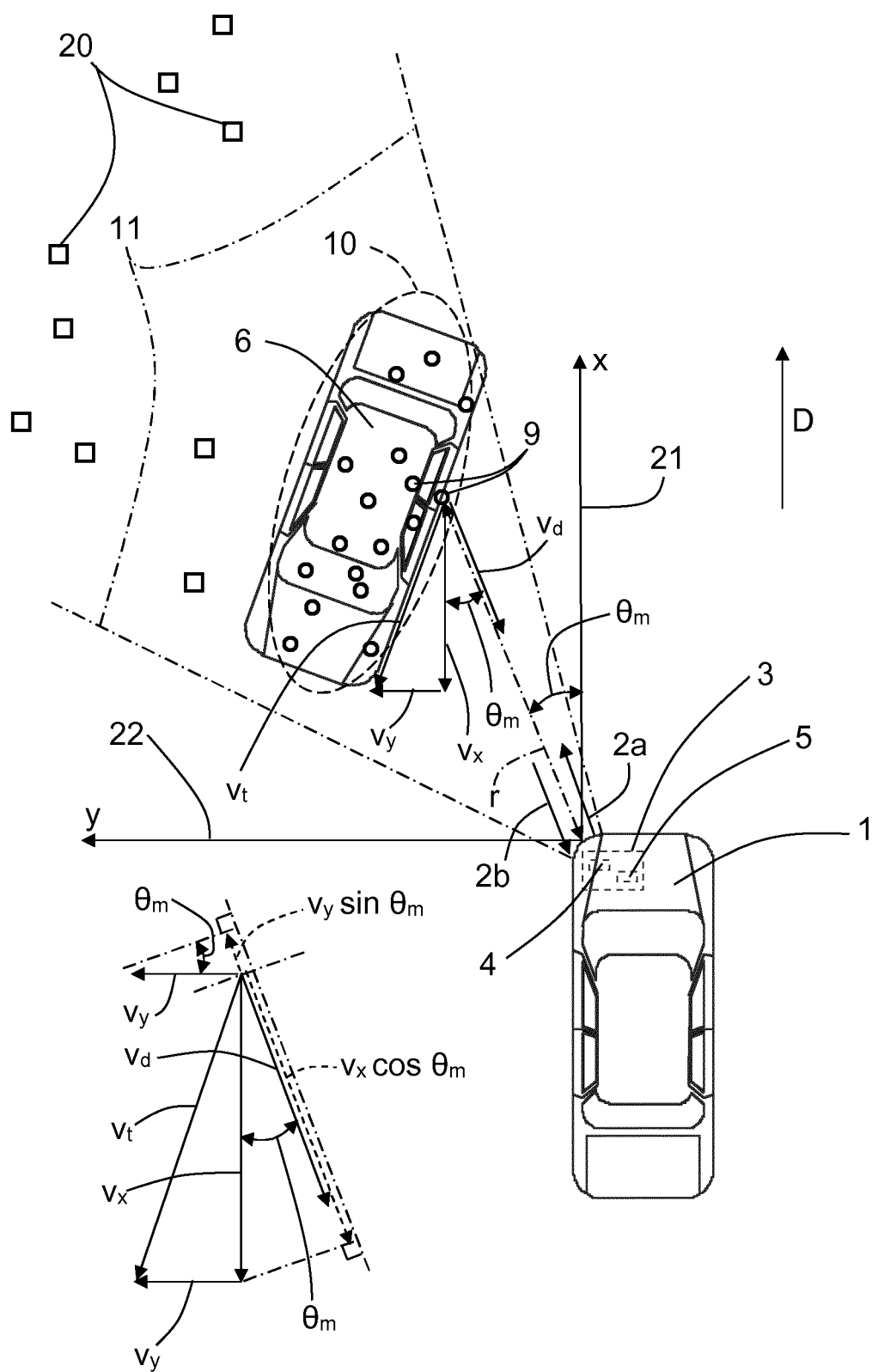
FIG. 1 shows a schematic top view of an ego vehicle and a target vehicle.

FIG. 1 schematically shows a top view of an ego vehicle 1 arranged to run in a direction D with a velocity $v_{ego}$, here co-inciding with a system x-axis 21. The vehicle 1 includes a vehicle radar system 3 which in turn includes a transceiver arrangement 4 and a control unit 5. The vehicle radar system 3 is arranged to distinguish and/or resolve single targets from the surroundings by transmitting signals 2a and receiving reflected signals 2b and using a Doppler effect in a previously well-known manner, the transceiver arrangement 4 having a certain field of view 11. The vehicle radar system 3 is thus arranged to provide data regarding azimuth angle and radial velocity for a possible target object 6 by simultaneously sampling and analyzing phase and amplitude of the received signals 2b by use of Doppler signal processing in a previously known manner. The radar signals may for example be in the form of FMCW (Frequency Modulated Continuous Wave) Doppler signals operating at 77 GHz.

By use of the vehicle radar system 3, a measured radial velocity $v_{dm}$, the Doppler velocity, is determined, for example from the Doppler frequency and the Doppler phase shift. Furthermore, a measured azimuth angle $\theta_m$ between a radial direction of observation and a radar system reference line such as the x-axis 21, as well as a measured radial distance $r_m$ between the transceiver arrangement 4 and a detection 9, are acquired for each one of a plurality of detections 9, 20 (only a few indicated in FIG. 1 for reasons of clarity), where there is a number N of detections 9 that belong to the target object 6 among a total number M≥N of detections 9, 20. Some of the detections 9 can be grouped as a tracked object, providing a common motion state for an extended object 10.

The motion state of an object describes, e.g., the distance from the ego vehicle 1 to a target object 6, a complete, relative or absolute, velocity vector of the object in relation to the ego vehicle, and a complete, relative or absolute, acceleration vector of the object in relation to the ego vehicle. The motion state of tracked objects is updated continuously to reflect changes in object motion.

In order to be able to identify and group those detections 9 that belong to a certain extended object 10, it is desired to determine which detections have the same velocity vector, which now will be described for a first example.

The target object 6 and its corresponding detections 9 have a relative velocity $v_t$ that has a velocity x-component $v_x$ and a velocity y-component $v_y$. The x-component $v_x$ runs parallel to the x-axis 21 and the y-component $v_y$ runs parallel to a y-axis 22, which in turn runs perpendicular to the x-axis 21. For the velocity x-component $v_x$ there is a corresponding acceleration x-component $a_x$, and for the velocity y-component $v_y$, there is a corresponding acceleration y-component $a_y$.

Assuming that all the detections 9 which are received from an extended object have the same direction of velocity, then the measured radial velocity $V_{dm}$ of each one of these detections 9 is given by projecting the relative velocity vector $v_t$ onto the radial direction. This is given by:

$$V_{dm}=V_x\cos(\theta_m)+V_y\sin(\theta_m)+w \quad (1)$$

as illustrated more in detail in the lower left part of FIG. 1. Here, w denotes noise. The present disclosure is directed towards a principle, and although practically present, the noise w is omitted in the rest of the text.

For an extended object, multiple detections 9 originate from the same target object 6, and each detection has its individual measured radial velocity $V_{dm}$. For all N detections 9 that originate from the same target object 6, a set of equations will be:

$$\begin{bmatrix} V_{dm_1} \\ V_{dm_2} \\ \vdots \\ V_{dm_N} \end{bmatrix} = \begin{bmatrix} \cos\theta_{m1} & \sin\theta_{m1} \\ \cos_{m2} & \sin\theta_{m2} \\ \vdots & \vdots \\ \cos\theta_{mN} & \sin\theta_{mN} \end{bmatrix} \begin{bmatrix} V_x \\ V_y \end{bmatrix} \quad (2)$$

It is desired to solve equation (2) for all M detections 9, 20 and to find the N detections 9 that originate from the same target object 6 and that correctly satisfy equation (2).

As there are two unknowns, at least two equations are needed so solve for the full velocity vector $v_x$, $v_y$. In case more detections are available, and hence more equations are available, the system becomes overdetermined and a least squares inversion can give the solution for the full velocity vector $v_x$, $v_y$.

The Random Sample Consensus (RANSAC) approach can be used to find the optimal solution, and it is robust to noise and outliers. This algorithm successively picks two random detections, and solves the above equation for the velocity components $v_x$, $v_y$ using only these two detections.

Each one of the resulting random hypotheses is evaluated and the best fit which best describes the remaining detections is selected. To increase robustness, detections from multiple radar cycles from the past can be added to increase the number of detections, and hence the number of equations. This, however, is only applicable if the velocity vector does not change.

In this context, a radar cycle is one observation phase during which the vehicle radar system 3 is arranged to acquire data, process the data on several signal processing levels and to send out available results. This can be a fixed time interval, or it can be a dynamic time interval depending on environment conditions and processing load.

Figure 2:
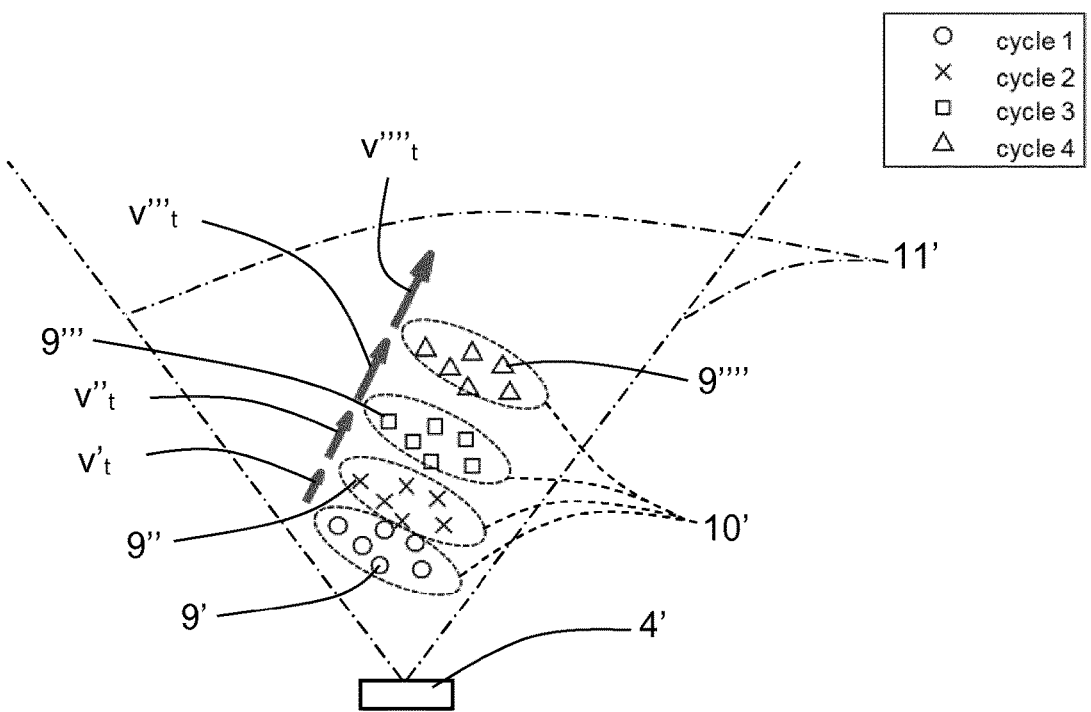
FIG. 2 shows a schematic illustration of an accelerating target object.

When the target object 6 is moving with an acceleration, the Doppler velocity of the detections 9 changes rapidly in each radar cycle, and therefore a standard RANSAC fit on data from multiple radar cycles does not give an accurate solution. With reference to FIG. 2, the relative velocity $v'_t$, $v''_t$, $v'''_t$, $v''''_t$ for an extended target object 10' that is moving away from a radar transceiver 4' with a certain constant acceleration is shown for four consecutive radar cycles in the radar transceiver's field of view 11'.

The detections 9', 9'', 9''', 9'''' for each radar cycle are shown with corresponding circles, crosses, squares and triangles.

Figure 3:
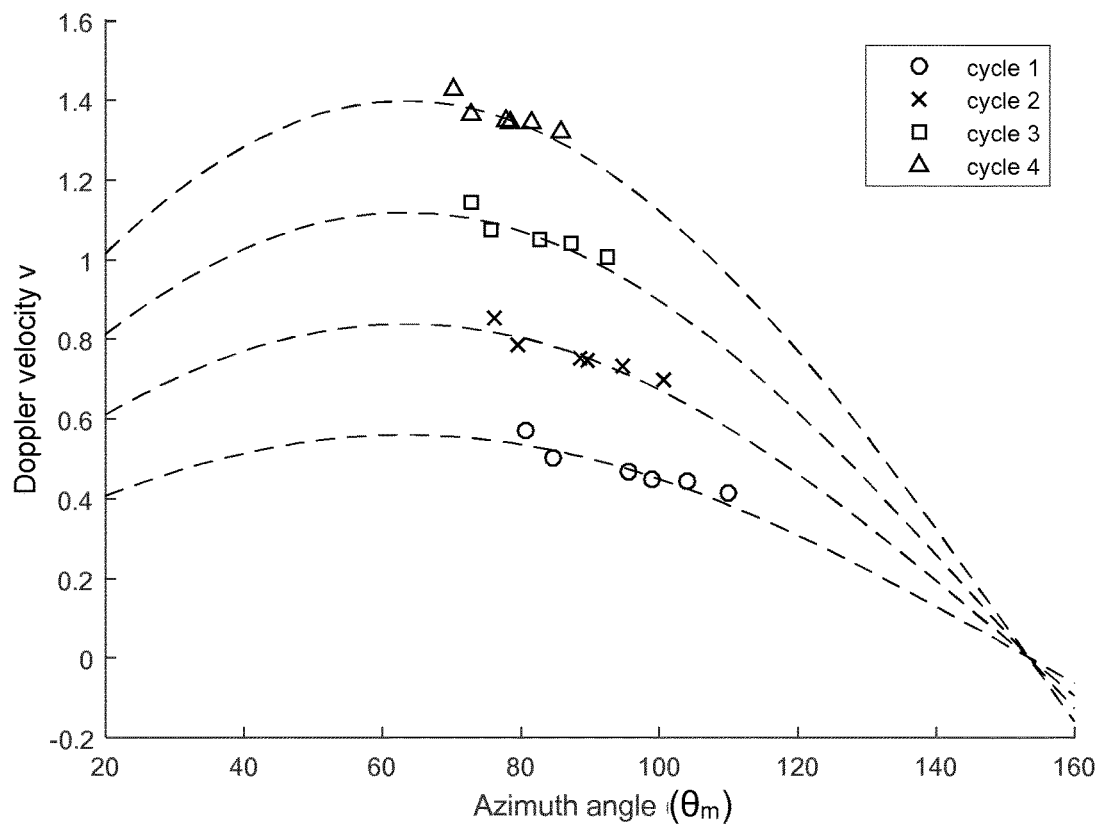
FIG. 3 shows a graphic illustration of radial Doppler velocity as a function of azimuth angle for an accelerating target object.

Correspondingly, FIG. 3 shows a graphic illustration of radial Doppler velocity as a function of azimuth angle for the accelerating target object 6'.

Therefore, in the cases where the target object 6 has a constant acceleration $a_x$, $a_y$, equation (1) becomes:

$$V_{dm} = (V_x + a_x \Delta t)\cos(\theta_m) + (V_y + a_y \Delta t)\sin(\theta_m) \quad (3)$$

For all N detections 9 that originate from the same target object 6, a set of equations will be:

$$\begin{bmatrix} V_{dm_1} \\ V_{dm_2} \\ \vdots \\ V_{dm_N} \end{bmatrix} = \begin{bmatrix} \cos\theta_{m1} & \sin\theta_{m1} \\ \cos_{m2} & \sin\theta_{m2} \\ \vdots & \vdots \\ \cos\theta_{mN} & \sin\theta_{mN} \end{bmatrix} \begin{bmatrix} (V_x + a_x \Delta t) \\ (V_y + a_x \Delta t) \end{bmatrix} \quad (4)$$

As for equation (2), it is desired to solve equation (4) for all M detections 9, 20 and to find the N detections 9 that originate from the same target object 6 and that correctly satisfy equation (4).

Thus, the four unknowns for the target velocity's and acceleration's x- and y-components $v_x$, $v_y$, $a_x$, $a_y$ need to be solved for. This is possible with at least four equations. Similar to the example described above for velocity only, the RANSAC method can be used to robustly estimate the four unknowns.

According to the present disclosure, for a certain radar cycle, the control unit 5 is adapted to consecutively select four detections 9 at random by use of which the four unknowns are solved. Out of the random hypotheses which are created this way, the control unit 5 is adapted to select the one which best describes the remaining detections.

This is accomplished by the control unit 5 that is adapted to:

Determine a calculated radial velocity $v_{dc}$ for each one of the selected detections by use of the calculated components $v_x$, $v_y$, $a_x$, $a_y$ using equation (3) for $v_{dc}$ instead of $v_{dm}$.

Determine an error between the calculated radial velocity $v_{dc}$ and the measured radial velocity $v_{dm}$.

Determine the number of inliers, where an inlier corresponds to an error that falls below an inlier threshold.

This is performed for a plurality of radar cycles such that a corresponding plurality of sets of components $v_x$, $v_y$, $a_x$, $a_y$ is acquired. The control unit 5 is then adapted to choose the set of components $v_x$, $v_y$, $a_x$, $a_y$ that results in the largest number of inliers.

An important advantage for this approach is its robustness to noise. This is achieved because all of the four unknowns are optimized simultaneously by solving a single globally optimal equation.

Inverting the above equation is feasible in the general case, but it is computationally expensive. Therefore, according to some aspects of the present disclosure, to simplify the calculations only detections which are measured at the same cycle are used in a first processing stage for solving the velocity components $v_x$, $v_y$. Then, additional detections from another radar cycle, for example a previous radar cycle, are used to solve the acceleration components $a_x$, $a_y$.

According to some aspects, the complexity can be reduced by using only three unknowns according to a following second example.

In practical applications, the most relevant case of acceleration is in a longitudinal direction, in a driving direction. Assuming that acceleration always is in the driving direction and there is no lateral movement, the acceleration components $a_x$, $a_y$ are substituted according to $$a_x = a \frac{V_x}{|V_r|} \text{ and } a_y = a \frac{V_y}{|V_r|},$$

where $|V_r|$ is the magnitude of the relative velocity $v_r$.

Then rewriting equation (3) results in:

$$V_{dm} = \left(V_x + a\frac{V_x}{|V_r|}\Delta t\right)\cos(\theta) + \left(V_y + a\frac{V_y}{|V_r|}\Delta t\right)\sin(\theta). \quad (5)$$

Simplifying equation (5) results in:

$$V_{dm} = V_x\left(1 + a\frac{1}{|V_r|}\Delta t\right)\cos(\theta_m) + V_y\left(1 + a\frac{1}{|V_r|}\Delta t\right)\sin(\theta_m) \quad (6)$$

$$V_{dm} = \left(1 + a\frac{1}{|V_r|}\Delta t\right)(V_x\cos(\theta_m) + V_y\Delta\sin(\theta_m)) \quad (7)$$

and $$\left(1 + a\frac{1}{|V_r|}\Delta t\right) = \frac{V_{dm}}{V_x\cos(\theta_m) + V_y\sin(\theta_m)}. \quad (8)$$

Substituting $\frac{V_{dm}}{V_x\cos(\theta_m) + V_y\sin(\theta_m)} = \omega$ results in:

$$\left(1 + a\frac{1}{|V_r|}\Delta t\right) = \omega \quad (9)$$

and finally:

$$a = \frac{(\omega - 1)}{\Delta t}|V_r|. \quad (10)$$

In order to make a fit, at least three detections are needed, either all from different radar cycles, or two detections from one radar cycle, i.e. the current radar cycle, and one detection from another radar cycle, i.e. the previous radar cycle. In that case, as in the previous first example, only detections which are measured at the same cycle are used in a first processing stage for solving the velocity components $v_x$, $v_y$. Then, additional detections from another radar cycle, for example a previous radar cycle, are used to solve the acceleration component a.

Optimization is achieved for three unknown variables, the target velocity's x- and y-components $v_x$, $v_y$ and the simplified acceleration component a simultaneously.

An important advantage for the approach according to the present disclosure is the fact that detections from multiple cycles can be used at the same time, which makes the algorithm robust even in case of low number of detections and in the presence of noise and outliers.

Figure 4:
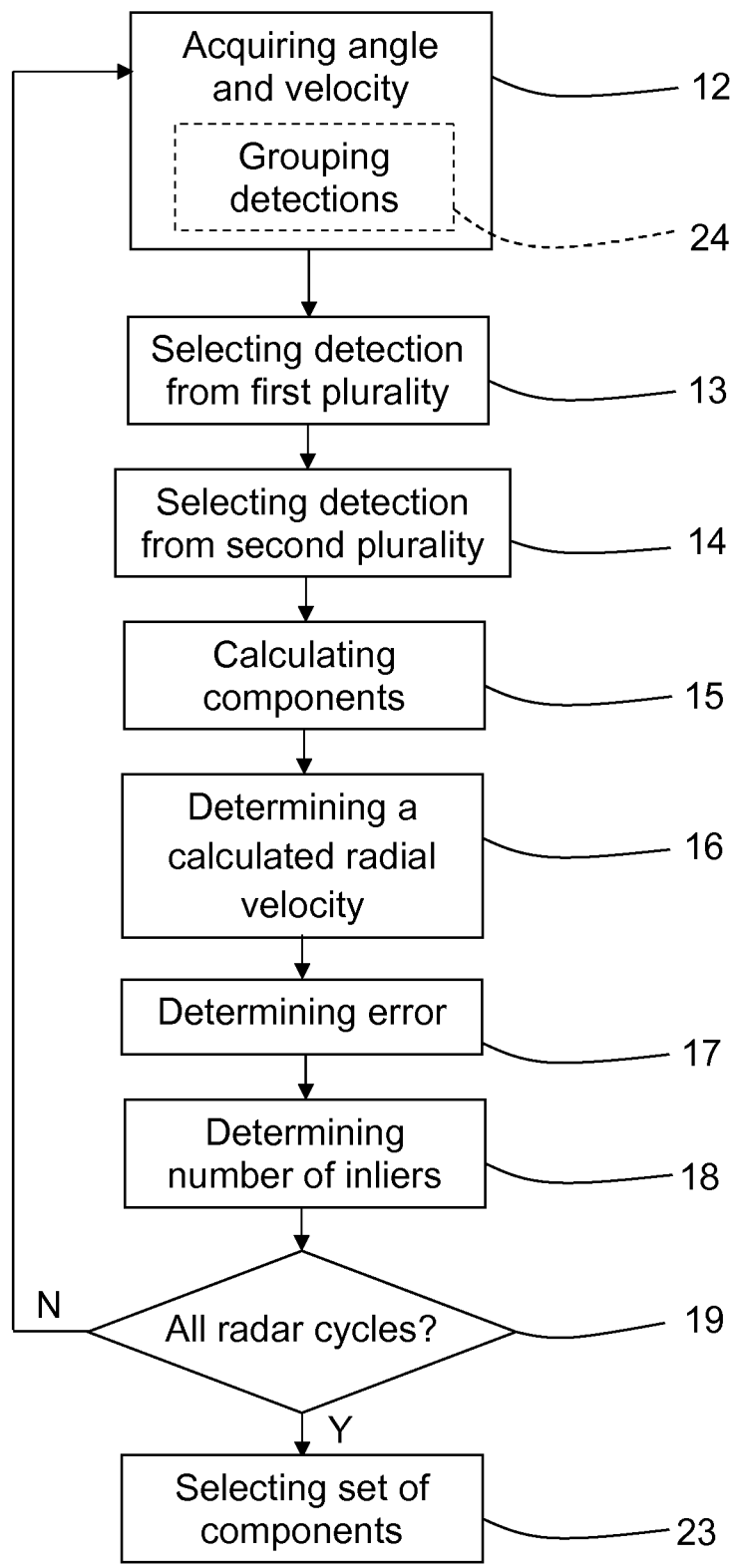
FIG. 4 shows a flowchart for methods according to the present disclosure.

With reference to FIG. 4, the present disclosure also relates to a method for a vehicle radar system 3, where, for each one of a plurality of radar cycles, the method includes the steps of:

Step 12: Acquiring a measured azimuth angle $\theta_m$ and a measured radial velocity $v_{dm}$ for a plurality of detections 9 associated with an object 6.

Step 13: Selecting one detection from the first plurality of detections 9, 20 for each one of two velocity components $v_x$, $v_y$ included in a set of components $v_x$, $v_y$, $a_x$, $a_y$; a to be determined, where the two velocity components $v_x$, $v_y$ define a full velocity vector for a relative velocity $v_r$.

Step 14: Selecting one detection a second plurality of detections 9, 20 for each one of at least one corresponding acceleration component $a_x$, $a_y$; a.

Step 15: Calculating the components $v_x$, $v_y$, $a_x$, $a_y$; a for the selected detections.

Step 16: Determining a calculated radial velocity $v_{dc}$ for each one of at least a part of the other detections in the first plurality of detections 9, 20 by use of the calculated components $v_x$, $v_y$, $a_x$, $a_y$; a.

Step 17: Determining an error between each calculated radial velocity $v_{dc}$ and the measured radial velocity $v_{dm}$.

Step 18: Determining the number of inliers, where an inlier corresponds to an error that falls below an inlier threshold.

Step 19: Repeating the above for all radar cycles in the plurality of radar cycles.

When all radar cycles in the plurality of radar cycles have been processed according to the above, when there are no radar cycles left in the plurality of radar cycles, the method then includes the steps of:

Step 23: Choosing the set of components $v_x$, $v_y$, $a_x$, $a_y$; a that results in the largest number of inliers.

According to some aspects, the method further includes the step of:

Step 24: Grouping those detections 9 that correspond to inliers resulting from the chosen set of components $v_x$, $v_y$, $a_x$, $a_y$; a, such that these detections 9 form an extended object 10.

The present disclosure is not limited to the examples above, but may vary freely within the scope of the appended claims. For example, the radar system may be implemented in any type of vehicles such as cars, trucks and buses as well as boats and aircraft.

The radar transceiver 4 is adapted for any suitable type of Doppler radar in a Doppler radar system. There may be any number of radar transceivers 4 in the vehicle radar system 3, and they may be arranged for transmission and signals in any suitable direction. The plurality of sensing sectors or sensing bins may thus be directed in other desirable directions, such as rearwards or at the sides of the vehicle 1.

Radar signal processing is performed in any kind of suitable control unit 5-of the vehicle radar system 3, such as a DSP (Digital Signal Processor) or an RCU (Radar Control Unit) which according to some aspects includes a DSP, or combination with separate or combined control unit arrangements.

Generally, the present disclosure relates to a vehicle radar system 3 where, for each one of a plurality of radar cycles, the radar system 3 is arranged to provide a measured azimuth angle $\theta_m$ and a measured radial velocity $v_{dm}$ for a first plurality of detections 9, 20. For each one of the plurality of radar cycles, the radar system 3 is arranged to:

select, one detection from the first plurality of detections 9, 20 for each one of two velocity components $v_x$, $v_y$ included in a set of components $v_x$, $v_y$, $a_x$, $a_y$; a to be determined, where the two velocity components $v_x$, $v_y$ define a full velocity vector for a relative velocity $v_r$;

select, one detection from a second plurality of detections 9, 20 for each one of at least one corresponding acceleration component $a_x$, $a_y$; a;

calculate the components $v_x$, $v_y$, $a_x$, $a_y$; a for the selected detections;

determine a calculated radial velocity $v_{dc}$ for each one of at least a part of the other detections in the first plurality of detections 9, 20 by use of the calculated components $v_x$, $v_y$, $a_x$, $a_y$; a;

determine an error between each calculated radial velocity $v_{dc}$ and the measured radial velocity $v_{dm}$;

determine the number of inliers, where an inlier corresponds to an error that falls below an inlier threshold;

where the radar system 3 furthermore is arranged to choose the set of components $v_x$, $v_y$, $a_x$, $a_y$; a that results in the largest number of inliers.

According to some aspects, the radar system 3 is adapted to group those detections 9 that correspond to inliers resulting from the chosen set, of components $v_x$, $v_y$, $a_x$, $a_y$; a such that these detections 9 form an extended object 10.

According to some aspects, the second plurality of detections 9, 20 is the same as the first plurality of detections.

According to some aspects, the second plurality of detections belongs to another radar cycle, where the radar system 3 is arranged to:

first calculate the velocity components $v_x$, $v_y$ for the selected detections;

then calculate the at least one acceleration component $a_x$, $a_y$; a by use of the calculated velocity components $v_x$, $v_y$.

According to some aspects, the second plurality of detections belongs to a previous radar cycle.

According to some aspects, the radar system 3 is arranged to calculate the components $v_x$, $v_y$, $a_x$, $a_y$; a by solving for these from the expression $$V_{dm} = (V_x + a_x \Delta t)\cos(\theta_m) + (V_y + a_y \Delta t)\sin(\theta_m)$$

for each selected detection, where $\theta_m$ constitutes a measured angle between a radar system reference line 21 and a direction towards the detection 9 in question.

According to some aspects, the radar system 3 is adapted to substitute $$a_x = a\frac{V_x}{|V_r|} \text{ and } a_y = a\frac{V_y}{|V_r|},$$

where $|V_r|$ is the magnitude of the relative velocity $v_r$, such that the components $v_x$, $v_y$, $a_x$, $a_y$; a are calculated by salving for these from the expression $$V_{dm} = \left(V_x + a\frac{V_x}{|V_r|}\Delta t\right)\cos(\theta_m) + \left(V_y + a\frac{V_y}{|V_r|}\Delta t\right)\sin(\theta_m).$$

Generally, the present disclosure relates to method for a vehicle radar system 3, where, for each one of a plurality of radar cycles, the method includes the steps of:

Step 12: acquiring a measured azimuth angle $\theta_m$ and a measured radial velocity $v_{dm}$ for a plurality of detections 9 associated with an object 6.

For each one of the plurality of radar cycles, the method further includes:

Step 13: selecting one detection from the first plurality of detections 9, 20 for each one of two velocity components $v_x$, $v_y$ included in a set of components $v_x$, $v_y$, $a_x$, $a_y$; a to be determined, where the two velocity components $v_x$, $v_y$ define a full velocity vector for a relative velocity $v_r$;

Step 14: selecting one detection from a second plurality of detections 9, 20 for each one of at least one corresponding acceleration component $a_x$, $a_y$; a;

Step 15: calculating the components $v_x$, $v_y$, $a_x$, $a_y$; a for the selected detections;

Step 16: determining a calculated radial velocity $v_{dc}$ for each one of at least a part of the other detections in the first plurality of detections 9, 20 by use of the calculated components $v_x$, $v_y$, $a_x$, $a_y$; a;

Step 17: determining a error between each calculated radial velocity $v_{dc}$ and the measured radial velocity $v_{dm}$; and Step 18: determining the number of inliers, where an inlier corresponds an error that falls below an inlier threshold; and Step 19: repeating the above for all radar cycles in the plurality of radar cycles; where the method then includes:

Step 23: choosing the set of components $v_x$, $v_y$, $a_x$, $a_y$; a that results in the largest number of inliers.

According to some aspects, the method further includes the step of:

Step 24: grouping those detections 9 that correspond to inliers resulting from the chosen set of components $v_x$, $v_y$, $a_x$, $a_y$; a, such that these detections 9 form an extended object 10.

According to some aspects, the second plurality of detections 9, 20 is the same as the first plurality of detections.

According to some aspects, the second plurality of detections belongs to another radar cycle, where the radar system 3 is arranged to:

first calculate the velocity components $v_x$, $v_y$ for the selected detections;

then calculate the at least one acceleration component $a_x$, $a_y$; a by use of the calculated velocity components $v_x$, $v_y$.

According to some aspects, the second plurality of detections belongs to a previous radar cycle.

According to some aspects, the method includes calculating the components $v_x$, $v_y$, $a_x$, $a_y$; a by solving for these from the expression:

$$V_{dm} = (V_x + a_x\Delta t)\cos(\theta_m) + (V_y + a_y\Delta t)\sin(\theta_m)$$

for each selected detection, where $\theta_m$ constitutes a measured angle between a radar system reference line 21 and a direction towards the detection 9 in question.

According to some aspects, the radar system (3) is adapted to substitute $$a_x = a\frac{V_x}{|V_r|} \text{ and } a_y = a\frac{V_y}{|V_r|},$$

where $|V_r|$ is the magnitude of the relative velocity $v_r$, such that the components $v_x$, $v_y$, $a_x$, $a_y$; a are calculated by solving for these from the expression $$V_{dm} = \left(V_x + a\frac{V_x}{|V_r|}\Delta t\right)\cos(\theta_m) + \left(V_y + a\frac{V_y}{|V_r|}\Delta t\right)\sin(\theta_m).$$

While the above description constitutes the preferred embodiment of the present invention, it will be appreciated that the invention is susceptible to modification, variation and change without departing from the proper scope and fair meaning of the accompanying claims.

The invention claimed is:

1. A vehicle radar system, comprising:
processing circuitry configured to:
acquire, for each one of a plurality of radar cycles, a plurality of detections including a corresponding measured azimuth angle and a corresponding measured radial velocity for each detection thereof;
for each cycle of the plurality of radar cycles:
select one detection from a first plurality of detections of the corresponding cycle for each one of two velocity components comprised in a set of components to be determined for a target, where the two velocity components define a full velocity vector for a relative velocity of the target;
select one detection from a second plurality of detections for each one of at least one corresponding acceleration component comprised in the set of components;
calculate the set of components based on the selected detections;
determine a calculated radial velocity for each one of at least a part of non-selected detections in the first plurality of detections based on the calculated set of components;
determine an error between each calculated radial velocity and the measured radial velocity for each one of at least the part of non-selected detections; and
determine a number of inliers for the corresponding cycle, where an inlier corresponds to a detection with the corresponding error that falls below an inlier threshold; and
choose, as a determined set of components for the target, the set of components from the calculated sets of components of the plurality of radar cycles that corresponds to a largest number of inliers among the determined numbers of inliers of the plurality of radar cycles.

2. The vehicle radar system according to claim 1, wherein the processing circuitry is further configured to group detections that correspond to inliers resulting from the chosen set of components, the grouped detections being identified as belonging to the target that is an extended object.

3. The vehicle radar system according to claim 1, wherein the second plurality of detections is the same as the first plurality of detections.

4. The vehicle radar system according to claim 1, wherein
the first plurality of detections and the second plurality of detections belong to different radar cycles, and
the processing circuitry is configured to, for each cycle of the plurality of radar cycles:
first calculate velocity components for the selected detections; and
then calculate the at least one acceleration component based on the calculated velocity components for the selected detections.

5. The vehicle radar system according to claim 4, wherein the second plurality of detections belongs to a previous radar cycle prior to the corresponding radar cycle which the first plurality of detections belongs.

6. The vehicle radar system according to claim 1, wherein the processing circuitry is configured to calculate the set of components by solving an expression of $$V_{dm} = (V_x + a_x \Delta t)\cos(\theta_m) + (V_y + a_y \Delta t)\sin(\theta_m)$$

for each selected detection, where $\theta_m$ constitutes the measured azimuth angle between a radar system reference line and a direction towards the corresponding detection in question, $V_{dm}$ represents the measured radial velocity of the corresponding detection, $V_x$ represents an x-component of velocity of the set of components, $V_y$ represents a y-component of velocity of the set of components, $a_x$ represents an x-component of acceleration of the set of components, $a_y$ represents a y-component of acceleration of the set of components, and $\Delta t$ represents a time difference of the selected detections.

7. The vehicle radar system according to claim 1, wherein the processing circuitry is configured to calculate the set of components by solving an expression of $$V_{dm} = \left(V_x + a\frac{V_x}{|V_r|}\Delta t\right)\cos(\theta_m) + \left(V_y + a\frac{V_y}{|V_r|}\Delta t\right)\sin(\theta_m).$$

for each selected detection, where $\theta_m$ constitutes the measured azimuth angle between a radar system reference line and a direction towards the corresponding detection in question, $V_{dm}$ represents the measured radial velocity of the corresponding detection, $V_x$ represents an x-component of velocity of the set of components, $V_y$ represents a y-component of velocity of the set of components, a represents an acceleration of the set of components, $|V_r|$ represents a magnitude of the relative velocity $V_r$, and $\Delta t$ represents a time difference of the selected detections.

8. The method according to claim 1, wherein the set of components is calculated by solving an expression of $$V_{dm} = \left(V_x + a\frac{V_x}{|V_r|}\Delta t\right)\cos(\theta_m) + \left(V_y + a\frac{V_y}{|V_r|}\Delta t\right)\sin(\theta_m).$$

for each selected detection, where $\theta_m$ constitutes the measured azimuth angle between a radar system reference line and a direction towards the corresponding detection in question, $V_{dm}$ represents the measured radial velocity of the corresponding detection, $V_x$ represents an x-component of velocity of the set of components, $V_y$ represents a y-component of velocity of the set of components, a represents an acceleration of the set of components, $|V_r|$ represents a magnitude of the relative velocity $V_r$, and $\Delta t$ represents a time difference of the selected detections.

9. A method for a vehicle radar system, comprising:
acquiring, for each one of a plurality of radar cycles, a plurality of detections including a corresponding measured azimuth angle and a corresponding measured radial velocity for each detection thereof;
for each cycle of the plurality of radar cycles:
selecting one detection from a first plurality of detections of the corresponding cycle for each one of two velocity components comprised in a set of components to be determined for a target, where the two velocity components define a full velocity vector for a relative velocity of the target;
selecting one detection from a second plurality of detections for each one of at least one corresponding acceleration component comprised in the set of components;
calculating the set of components based on the selected detections;
determining a calculated radial velocity for each one of at least a part of non-selected detections in the first plurality of detections based on the calculated set of components;
determining an error between each calculated radial velocity ($v_{dc}$) and the measured radial velocity for each one of at least the part of non-selected detections; and
determining a number of inliers for the corresponding cycle, where an inlier corresponds to a detection with the corresponding error that falls below an inlier threshold; and
choosing, as a determined set of components for the target, the set of components from the calculated sets of components of the plurality of radar cycles that corresponds to a largest number of inliers among the determined numbers of inliers of the plurality of radar cycles.

10. The method according to claim 9, wherein the method further comprises:
grouping detections that correspond to inliers resulting from the chosen set of components, the grouped detections being identified as belonging to the target that is an extended object.

11. The method according to claim 9, wherein the second plurality of detections is the same as the first plurality of detections.

12. The method according to claim 9, wherein
the first plurality of detections and the second plurality of belong to different radar cycles, and
the method comprises, for each cycle of the plurality of radar cycles:
first calculating velocity components for the selected detections; and
then calculate the at least one acceleration component based on the calculated velocity components for the selected detections.

13. The method according to claim 12, wherein the second plurality of detections belongs to a previous radar cycle prior to the corresponding radar cycle which the first plurality of detections belongs.

14. The method according to claim 9, wherein the set of components is calculated by solving an expression of $$V_{dm}=(V_x+a_x\Delta t)\cos(\theta_m)+(V_y+a_y\Delta t)\sin(\theta_m)$$

for each selected detection, where $\theta_m$ constitutes the measured azimuth angle between a radar system reference line and a direction towards the corresponding detection in question, $V_{dm}$ represents the measured radial velocity of the corresponding detection, $V_x$ represents an x-component of velocity of the set of components, $V_y$ represents a y-component of velocity of the set of components, $a_x$ represents an x-component of acceleration of the set of components, $a_y$ represents a y-component of acceleration of the set of components, and $\Delta t$ represents a time difference of the selected detections.

\* \* \* \* \*